(12) United States Patent
Page

(10) Patent No.: US 9,341,413 B2
(45) Date of Patent: May 17, 2016

(54) COOLING TOWER WITH FIRE STOP

(71) Applicant: John B. Page, Barrie (CA)

(72) Inventor: John B. Page, Barrie (CA)

(73) Assignee: PYROPHOBIC SYSTEMS, LTD., Barrie (CA)

( * ) Notice: Subject to any disclaimer, the term of this patent is extended or adjusted under 35 U.S.C. 154(b) by 350 days.

(21) Appl. No.: 13/796,033

(22) Filed: Mar. 12, 2013

(65) Prior Publication Data

US 2014/0264976 A1 Sep. 18, 2014

(51) Int. Cl.
*F28C 1/00* (2006.01)

(52) U.S. Cl.
CPC ............... *F28C 1/00* (2013.01); *F28F 2265/00* (2013.01)

(58) Field of Classification Search
CPC ........................................................ F28C 1/00
See application file for complete search history.

(56) References Cited

U.S. PATENT DOCUMENTS

| | | | |
|---|---|---|---|
| 4,093,818 A | 6/1978 | Thwaites et al. | |
| 4,292,358 A | 9/1981 | Fryer et al. | |
| 4,299,872 A | 11/1981 | Miguel et al. | |
| 5,585,047 A | 12/1996 | Mortensen et al. | |
| 6,790,893 B2 | 9/2004 | Nguyen et al. | |
| 7,191,845 B2 | 3/2007 | Loar | |
| 7,413,024 B1 | 8/2008 | Simontacchi et al. | |
| 2011/0042515 A1 | 2/2011 | Schoke et al. | |
| 2012/0022201 A1 | 1/2012 | Zhvanetskiy et al. | |

FOREIGN PATENT DOCUMENTS

| | | |
|---|---|---|
| AU | 2011269334 A1 | 2/2013 |
| GB | 1368424 A | 9/1974 |
| WO | WO-97/06881 A1 | 2/1997 |

*Primary Examiner* — Duane Smith
*Assistant Examiner* — Adam W Bergfelder
(74) *Attorney, Agent, or Firm* — Marshall, Gerstein & Borun LLP

(57) ABSTRACT

A cooling tower with a plurality of fill packs has a fire stop with openings disposed below the fill packs, a water distribution system for distributing water onto the fill packs, and a cold water basin disposed below the fire stop for collecting water which has past through said fill packs. The openings in the fire stop occupy at least 80% of the area over which the fire stop extends. The fire stop is made of an intumescent material with an expansion ratio sufficient to close said openings when said material intumesces.

18 Claims, 3 Drawing Sheets

COOLING TOWER WITH FIRE STOP

BACKGROUND

Cooling towers are used as part of an HVAC system in buildings in order to cool water that is circulated through the building. Cooling towers are also used in factories to cool water heated in factory processes. Often cooling towers are situated on a roof of a building. Because cooling towers have combustible components they present a fire risk. It is known to install sprinkler systems in cooling towers to protect the towers from fires. While this can be an effective approach, the cost of installing and maintaining a sprinkler system in a cooling tower can be high. It would therefore be advantageous to provide another approach to deal with the fire risk associated with cooling towers.

SUMMARY

To limit the consequences of a fire in or proximate a cooling tower, one or more intumescent fire stops are provided in the cooling tower.

In an aspect, there is provided a cooling tower with a plurality of fill packs has a fire stop with openings disposed below the fill packs, a water distribution system for distributing water onto the fill packs, and a cold water basin disposed below the fire stop for collecting water which has past through said fill packs. The openings in the fire stop occupy at least 80% of the area over which the fire stop extends. The fire stop is made of an intumescent material with an expansion ratio sufficient to close said openings when said material intumesces.

In another aspect, there is provided, a grid for use as a fire stop in a cooling tower. The grid has grid walls defining openings therebetween. The openings in the grid occupy at least 80% of the area over which the grid extends. The grid walls are made of a composition of an intumescent material and a thermoplastic material, the intumescent material having an expansion ratio sufficient to close the openings when the material intumesces.

Other features and advantages will become apparent from the following description of example embodiments in conjunction with the figures.

DRAWINGS

Figure 1:
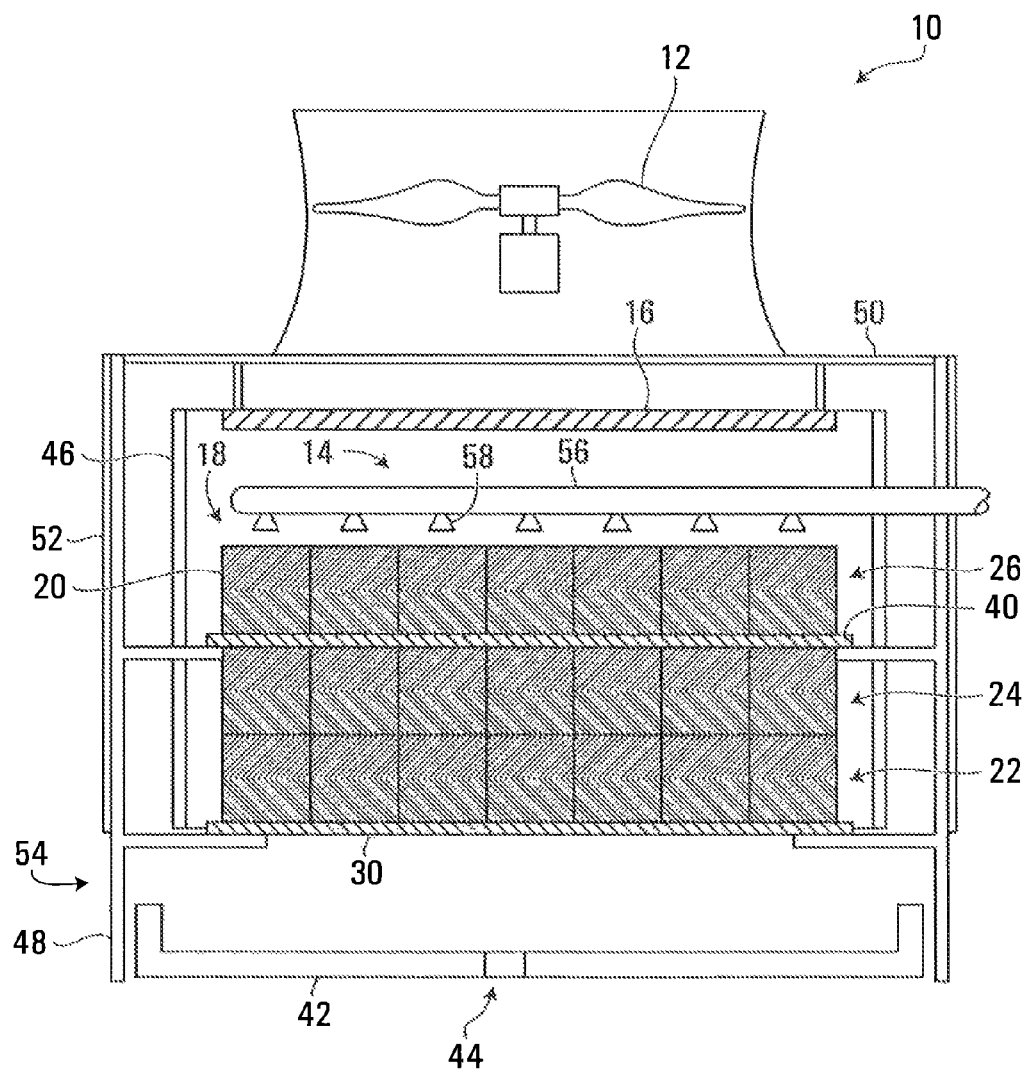
Figure 2:
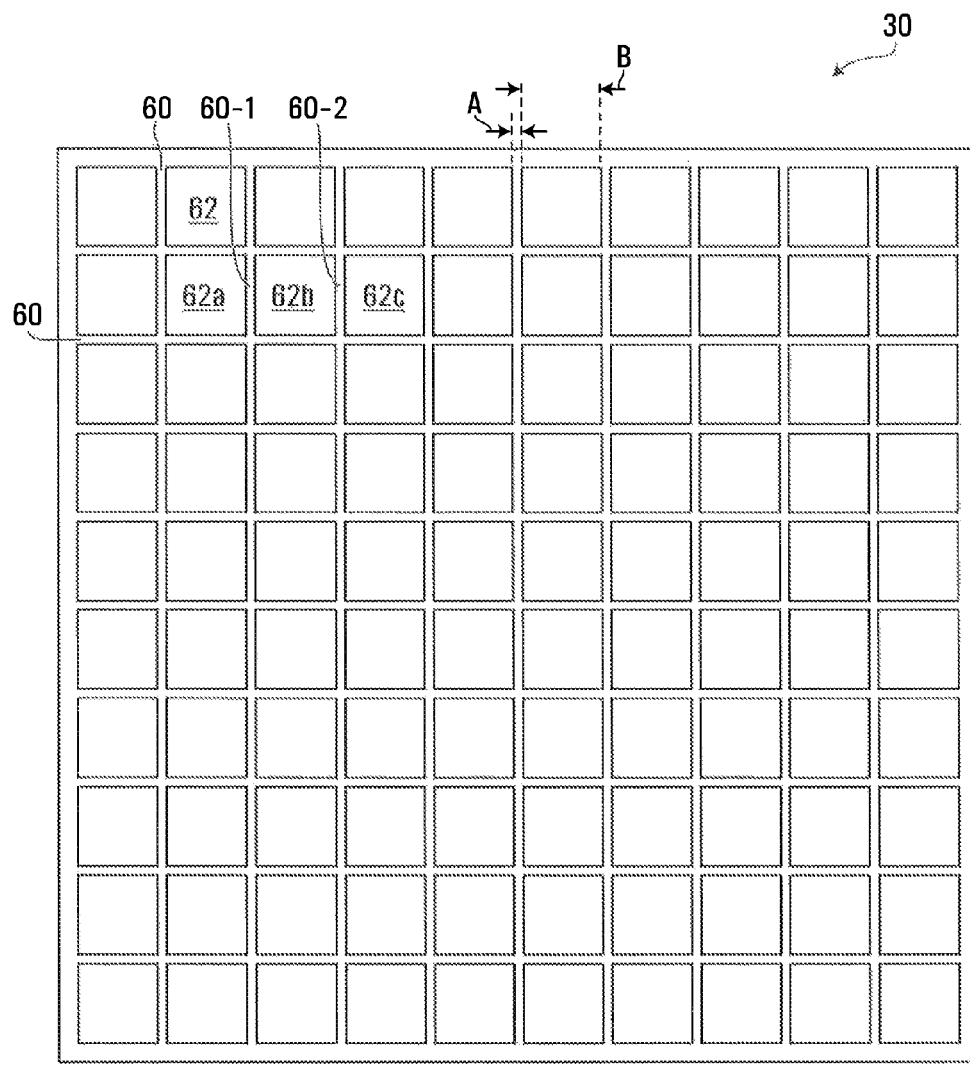
Figure 3:
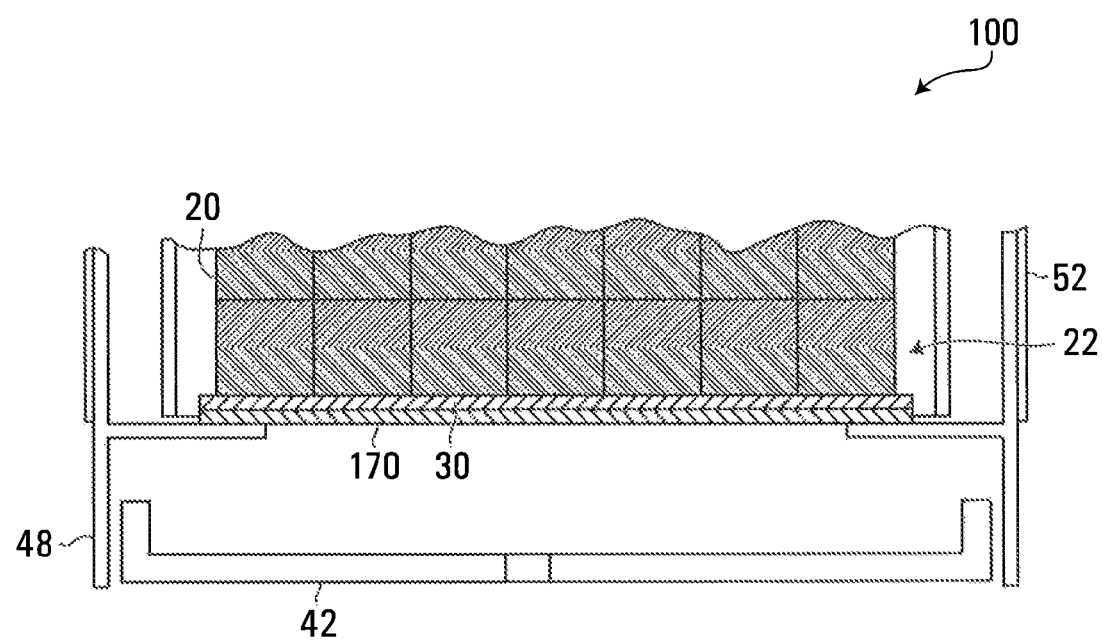

In the figures which illustrate example embodiments,

FIG. 1 is a schematic representation of a cooling tower made in accordance with an embodiment, FIG. 2 is a plan view of a fire stop of the cooling tower of FIG. 1, and FIG. 3 is a schematic representation of a portion of a cooling tower made in accordance with another embodiment.

DETAILED DESCRIPTION

Turning to FIG. 1, a cooling tower 10 has a fan 12 disposed above a hot water distribution system 14. Drift eliminators 16 are positioned between the fan 12 and hot water distribution system 14. The hot water distribution system 14 overlies a fill region 18 containing fill packs 20 arranged into layers 22, 24, 26. A fire stop 30 is disposed below the lowermost layer 22 of fill packs and a second fire stop 40 is disposed between the upper 26 and middle 24 layers of fill packs. The fill region extends above a cold water basin 42 with a drain 44.

A fire retardant blanket 46 wraps around the fill region 18. The cooling tower has a frame 48 which supports the water distribution system 14, fire stop grids 30, 40, a fan deck 50 on which the fan 12 rests, and a housing 52 of the tower. The base of the housing has windows 54 to the interior of the housing. The drift eliminators 16 may be suspended from the fan deck. The layers of fill packs may be supported by the fire stop grids 30, 40.

The hot water distribution system has a plurality of pipes 56 from which water nozzles 58 depend.

Each fill pack 20 has closely spaced plastic sheets that define a serpentine path between the top and bottom of the fill pack.

Turning to FIG. 2, fire stop 30 is configured as a grid with grid walls 60 forming a series of square openings 62 between the grid walls. The walls 60 may have a width A and the square openings 62, a width B.

The material of the grid walls may be any of the compositions described in US2012/0022201 to Zhvanetskiy et al. published Jan. 26, 2012, the contents of which are incorporated herein by reference. The material of the grid walls may also be any of the compositions described in U.S. Pat. No. 6,790,893 to Nguyen et al. issued Sep. 14, 2004, the contents of which are incorporated herein by reference. Thus, the material of the grid walls is a composition containing an intumescent material and a thermoplastic.

As described in US2012/0022201, the intumescent material of the composition may be an expandable graphite, which may be an intercalated graphite present in the amount of about 5% to about 55% by weight of the composite. The thermoplastic may be a thermoplastic polymer, such as polyvinyl chloride (PVC), polyethylene (PE), or polypropylene (PP). When a halogenated thermoplastic such as PVC is used in the composition, the halogen released upon combustion may act as a flame retardant. The thermoplastic may be present in the amount of about 30% to about 60% by weight of the composition. The amount of the thermoplastic may be selected to provide sufficient mechanical strength and processability for the material. The composition may also include flame retardants, for example, alumina trihydrate (ATH) and brominated antimony. In some embodiments, such as when the composition includes a separate halogenated fire retardant, the thermoplastic itself may be free of halogen.

Alternatively, as described in U.S. Pat. No. 6,790,893, the intumescent material of the composition may be a lithium/sodium/potassium silicate, present in the amount of about 5% to about 50% by weight of the composition with the balance being a thermoplastic polymer and, optionally, a filler such as a low-temperature frit.

The composition of fire stop 30, 40 in a given application may vary and may be selected in consideration of the specific structural configuration and the operating conditions of the cooling tower, and the physical and chemical properties of the grid wall to be achieved. Fire stop 30 and 40 may be formed of the same or different materials.

A specific suitable material for the grid walls is as follows, where each percentage is by weight percentage:

Low Density Polyethylene (LOPE) 41.9%
expandable Graphite 30%
antimony trioxide (ATO) 3%
ethane-1,2-bis(pentabromophenyl) (EBPBP) 9%
alumina trihydrate (ATH) 15%
filler 1%
antioxidant 0.1%.

This material intumesces around 200° C. and will expand more than tenfold during intumescence.

The fire stops may be formed by molding a grid from this material.

The width of each square opening of the grid is many times the width of the walls surrounding the opening and the grid walls are designed to expand by at least this many times. For example, where the grid walls will expand by more than tenfold during intumescence, the width, B, of the square openings may be up to ten times the width, A, of the grid walls. This is because a given wall segment 60-1 between two openings 62a, 62b, in expanding more than tenfold, will expand more than fivefold into opening 62a and more than fivefold into opening 62b. Likewise, an adjacent wall segment 60-2 between openings 62b and 62c will expand more than fivefold into each of these openings. The result is that wall segment 60-1 expands by over 5*A into one side of opening 60b and wall segment 60-2 expands by over 5*A into the opposite side of opening 60b. Thus, if the width, B, of opening 62b is 10*A, the opening will be completely closed off by the expanding wall segments. This is repeated throughout the grid so that all of the openings are closed off during intumescence.

The grid walls may be of uniform width and thickness and may have a width between ⅝" (1.6 cm) to 2" (5.1 cm) and a thickness of about 1½" (3.8 cm). If the grid walls have a width of 1" (2.5 cm) and the square openings are 10" (25.4 cm) across then a grid with a 10×10 pattern of square openings will be about 9' square which may be a suitable size for some cooling towers.

For a grid with a 10×10 pattern of square openings, the area covered by the openings of the grid will be more than 80% of the area covered by the grid if the openings are at least ten times wider than the walls. This can be seen from the following. If the walls have a width A and the square openings are ten times wider than the walls, they will have a total area equivalent to the number of openings, 100, times the area of each opening (10A*10A), or 10,000$A^2$. Each side of the grid will have a length equal to:

$$10*(10A+A)+A=111A$$

Thus, the area of the grid will be $(111A)^2$, or 12,321$A^2$. Therefore, the proportion of the area of the grid which is covered by the openings in the grid is 10,000/12,321, or 81% of the grid.

Thus, even though the openings in the example 10×10 grid with 1" wide walls will cover over 80% of the area covered by the grid, it has been shown that if the walls expand by at least tenfold on intumescence, the openings will close off on intumescence. Indeed, the openings could be made larger to cover an even higher percentage of the area of the grid if the grid walls have a higher expansion ratio on intumesence.

The fire retardant blanket 46 may be formed by a series of fire retardant sheets that are hung from the cooling tower by metal clips. Each sheet may be extruded from the same material as used to fabricate the grid walls of either of the fire stops 30, 40.

Returning to FIG. 1, in normal operation of the cooling tower, fan 12 operates to draw air through windows 54 and up through the fill region 18. At the same time, hot water flows through pipe 56 and is sprayed by nozzles 58 onto the top of the fill region. Gravity draws the water downwardly along the serpentine paths of the fill packs until the water falls into the cold water basin 42 and flows out drain 44. At the same time water is moving downwardly along the serpentine paths through the fill packs, air is drawn upwardly through these paths by the fan. This intimately exposes the water to the air allowing effective heat transfer from the water to the air.

While passing through the fill region, some of the water will evaporate into the air. However, as this moisture laden air moves through the drift eliminators 16, water will condense onto these eliminators and drop down again toward the fill region.

Once the water leaves the drain 44 of the cold water basin it is re-used in the building and is ultimately again passed back to the hot water distribution system 14. As some water is inevitably lost through the cooling tower, in a typical system, make-up water is added as required.

This normal operation described thusfar is conventional. However, cooling tower 10 also has fire stops 30 and 40. Nevertheless, as the area covered by these fire stop grids is at least 80% open, the grids do not significantly interfere with the air flow through the tower. Thus, they do not significantly interfere with the normal operation of the tower.

On the other hand, in the event of a fire in or adjacent the cooling tower, the grids heat up to the temperature of intumescence of the intumescent material of the grids and the openings through the grids close off so that the grids become plates that act to block the spread of fire. Thus if, for example, a fire started below the cooling tower, the fire stop 30 would close off to assist in preventing the fire from spreading into the fill region. If the fire persisted, it may be fire stop 30 would eventually fail. In this instance, fire stop 40 would provide a secondary fire stop to impede the spread of the fire.

As the grids are heated, the thermoplastic of which they are partially composed will soften which may cause the grid walls to begin to slump. At the same time, the grid walls will be expanding due to the intumescent material and, additionally, the intumescent material may form a hard char. Providing an intumescent with an expansion ratio greater than the minimum needed to close off the holes of the grid helps ensure these holes will close off even where there is some slump in the grid.

The fire retardant blanket 46 provides an additional measure of fire protection.

While the example cooling tower 10 is shown with two grids, sufficient fire protection may be available even with only a single grid. In such case, the single grid would normally be disposed below the fill region. On the other hand, in some installations, more than two grids may be employed, especially where there are multiple layers of fill packs.

While grid 30 is shown as supporting layers of fill packs, this is not necessary and the fill packs may be supported by, for example, hangars extending from the frame 48. In this instance, the grid 30 need not abut the bottom of the lowermost layer of fill packs but could instead be disposed below the fill packs.

Turning to FIG. 3 wherein like parts have been given like reference numerals, in another embodiment, a cooling tower 100 has a support grid 170 on which fire stop 30 rests. Support grid 170 is not an intumescent grid but serves to support fire stop 30 and the fill packs of the fill region. With this modification, fire stop 30 is configured as a grid with openings that register with the openings of the support grid 170. In consequence, grid 30 will not increase the resistance to air flow through the tower.

In some embodiments, the material of the grid walls of fire stop 30, 40 may have a composition other than those described in US2012/0022201 or U.S. Pat. No. 6,790,893, so long as the material of the grid walls has an expansion ratio sufficient to close the openings when the material intumesces, and has suitable physical and chemical properties for the particular application. For example, if the grid walls are used to support fill packs, the material of the grid walls will need to have sufficient mechanical strength.

While the example towers are counterflow towers (where the air flows in the opposite direction to the water), the described intumescent grids could equally be used with cross-flow towers (where a fan pushes air transversely across the tower). Also, while example tower 10 is an induced draft tower (with a fan to move air through the tower), the described intumescent grids could equally be used with natural draft towers.

Other modifications will be apparent to those skilled in the art.

What is claimed is:

1. A cooling tower comprising:
    a plurality of fill packs;
    a fire stop with openings, said fire stop disposed below said fill packs;
    a water distribution system arranged for distributing water onto said fill packs;
    a cold water basin disposed below said fill packs and said fire stop for collecting water which has past through said fill packs;
    said fire stop extending over an area, said openings in said fire stop occupying at least 80% of said area;
    said fire stop comprising an intumescent material with an expansion ratio sufficient to close said openings when said material intumesces.

2. The cooling tower of claim 1 wherein said fire stop comprises a composition containing said intumescent material and a thermoplastic material.

3. The cooling tower of claim 2 wherein said fire stop is configured as a grid.

4. The cooling tower of claim 3 wherein said fill packs are arranged into layers of said fill packs.

5. The cooling tower of claim 4 wherein a lowermost layer of said layers of fill packs rests on said grid.

6. The cooling tower of claim 3 wherein said fill packs are supported by said grid.

7. The cooling tower of claim 4 wherein said grid is an intumescent grid and further comprising a support grid, said intumescent grid resting on said support grid, said openings of said intumescent grid aligned with openings through said support grid.

8. The cooling tower of claim 4 wherein said grid is a first grid and further comprising a second grid comprising a composition of said intumescent material and said thermoplastic material, said second grid disposed between two adjacent layers of said fill packs.

9. The cooling tower of claim 8 further comprising a fire retardant blanket extending along at least one outer side of said layers of fill packs.

10. The cooling tower of claim 4 further comprising a frame and wherein said grid is supported by said frame.

11. The cooling tower of claim 3 wherein said intumescent material is between 5% and 55% by weight of said composition.

12. The cooling tower of claim 11 wherein said thermoplastic material is between 30% and 60% by weight of said composition.

13. The cooling tower of claim 12 wherein said thermoplastic material is polyvinyl chloride.

14. The cooling tower of claim 3 wherein said intumescent material is an expandable graphite.

15. The cooling tower of claim 3 wherein any given opening has a width that is a multiple of a width of grid walls on opposed sides of said any given opening and wherein said intumescent material has an expansion ratio at least equivalent to said multiple.

16. The cooling tower of claim 4 wherein said openings of said grid are square-shaped.

17. The cooling tower of claim 16 wherein said grid walls have a width of ⅝" (1.6 cm) to 2" (5.1 cm).

18. The cooling tower of claim 17 wherein said intumescent material has at least a tenfold expansion ratio.

* * * * *